United States Patent [19]

Bouton, Jr. et al.

[11] 3,829,673

[45] Aug. 13, 1974

[54] FLOATING POINT ARITHMETIC UNIT ADAPTED FOR CONVERTING A COMPUTER TO FLOATING POINT ARITHMETIC

[75] Inventors: Frank M. Bouton, Jr., Maitland, Fla. Thomas R. Prints, Portland, Oreg.

[73] Assignee: Floating Point Systems, Inc., Portland, Oreg.

[22] Filed: June 20, 1972

[21] Appl. No.: 264,518

[52] U.S. Cl. .................................. 235/164, 235/175

[51] Int. Cl. ............................. G06f 7/50, G06f 7/54

[58] Field of Search ........... 235/164, 160, 159, 156, 235/168, 175

[56] References Cited

UNITED STATES PATENTS

| | | | |
|---|---|---|---|
| 3,022,006 | 2/1962 | Alrich et al. | 235/160 |
| 3,037,701 | 6/1962 | Sierra | 235/159 |
| 3,043,509 | 7/1962 | Brown et al. | 235/156 |
| 3,056,550 | 10/1962 | Horrell | 235/164 |
| 3,182,180 | 5/1965 | Keir | 235/164 |
| 3,244,864 | 4/1966 | Jones | 235/168 |
| 3,254,204 | 5/1966 | Merner | 235/160 |
| 3,489,888 | 1/1970 | Wilhelm, Jr. et al. | 235/164 |
| 3,697,734 | 10/1972 | Booth et al. | 235/164 |

*Primary Examiner*—Malcolm A. Morrison
*Assistant Examiner*—David H. Malzahn
*Attorney, Agent, or Firm*—Klarquist, Sparkman, Campbell, Leigh, Hall & Whinston

[57] ABSTRACT

A floating point converter for adapting a conventional computer to floating point arithmetic includes an exponent circuit for receiving the respective floating point exponents and selectively providing the sum, the difference, or the larger of the two. The converter further includes a mantissa circuit for receiving the respective mantissa inputs and applying the same to a computational loop. This loop includes an output shift register, an adder for algebraically adding the contents of the shift register to one of the input mantissas, and gating circuitry for selectively entering the results of addition to said register or alternatively entering the second mantissa input into said register. A quotient register further receives successive most significant bits of successive subtractions occurring during division and subsequently provides a quotient output to said shift register via said gating circuitry.

15 Claims, 10 Drawing Figures

FLOATING POINT ARITHMETIC UNIT ADAPTED FOR CONVERTING A COMPUTER TO FLOATING POINT ARITHMETIC

BACKGROUND OF THE INVENTION

In floating point computation, a given factor is expressed as a fractional mantissa and an exponent indicating the power to which the base must be raised in order to express a multiplier. While many computers are implemented circuitwise to perform floating point arithmetic, many other less expensive computing systems or mini-computers can perform floating point arithmetic only on the basis of a time-consuming software routine. It has been estimated that the larger percentage of the execution time for an overall computer program may be consumed by routines adapted to carry out the conversion to floating point arithmetic.

Larger computers, which employ floating point hardware, make extensive use of the computer memory during floating point operations in accessing information into and out of core memory, with floating point arithmetic being largely conducted in discrete conventional computing steps. Various floating point hardware converters have been constructed which adapt a conventional computer to floating point operation and which should have the advantage of faster operation as compared with implementing floating point operation with software routines. However, these converters also either access computer memory for the various computational steps, or contain substantially the equivalent within a floating point converter in the form of multiple registers or accumulators wherein information may be stored after partial computation and retrieved for further computation. Thus, conventional converters tend to be relatively expensive in their implementation and may also be relatively slow in operation.

SUMMARY OF THE INVENTION

In accordance with the present invention, a floating point converter system is adapted for coupling to a computer through input means comprising input registers or the like. The floating point converter system includes an output shift register which not only supplies the output mantissa, but which forms part of a floating point computational loop adapted for a plurality of arithmetic operations. This loop includes the aforementioned output shift register, and adding means for algebraically adding one of a pair of mantissa inputs to a second mantissa input stored in the aforementioned shift register. The computational loop is completed by gating means which selectively couples the output sum back into the aforementioned shift register, or alternatively couples the aforementioned second mantissa input into the aforementioned shift register. The aforementioned gating means also selectively receives information from a quotient register operated in response to adding means outputs, for subsequent entry into such shift register. Control means are provided for selectively incrementing or decrementing the output exponent in an output exponent counter, substantially simultaneously with the shifting of information in the aforementioned shift register.

In the hardware floating point converting system as described, a plurality of computations, such as addition, subtraction, multiplication and division, are selectively provided within relatively short cycle times, i.e., in and out of the aforementioned output shift register, with this output shift register containing the subsequent mantissa result. Additional cycles for accessing information from some type of memory or further memory registers are not required, resulting in not only operational speed but also in system simplicity.

It is accordingly an object of the present invention to provide an improved floating point system for implementing floating point arithmetic by means of a hardware converter instead of a time-consuming software routine.

It is a further object of the present invention to provide an improved floating point system adapted for rapidly performing floating point arithmetic operations with a minimum of circuit complexity.

It is another object of the present invention to provide an improved floating point hardware system adapted to provide floating point arithmetic operations without extensive access to memory, temporary storage registers, or the like.

It is a further object of the present invention to provide an improved floating point system including a novel computational loop for performing a number of arithmetic operations with a minimum of computational apparatus and a reduced number of operational cycles.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figures 1, 2:
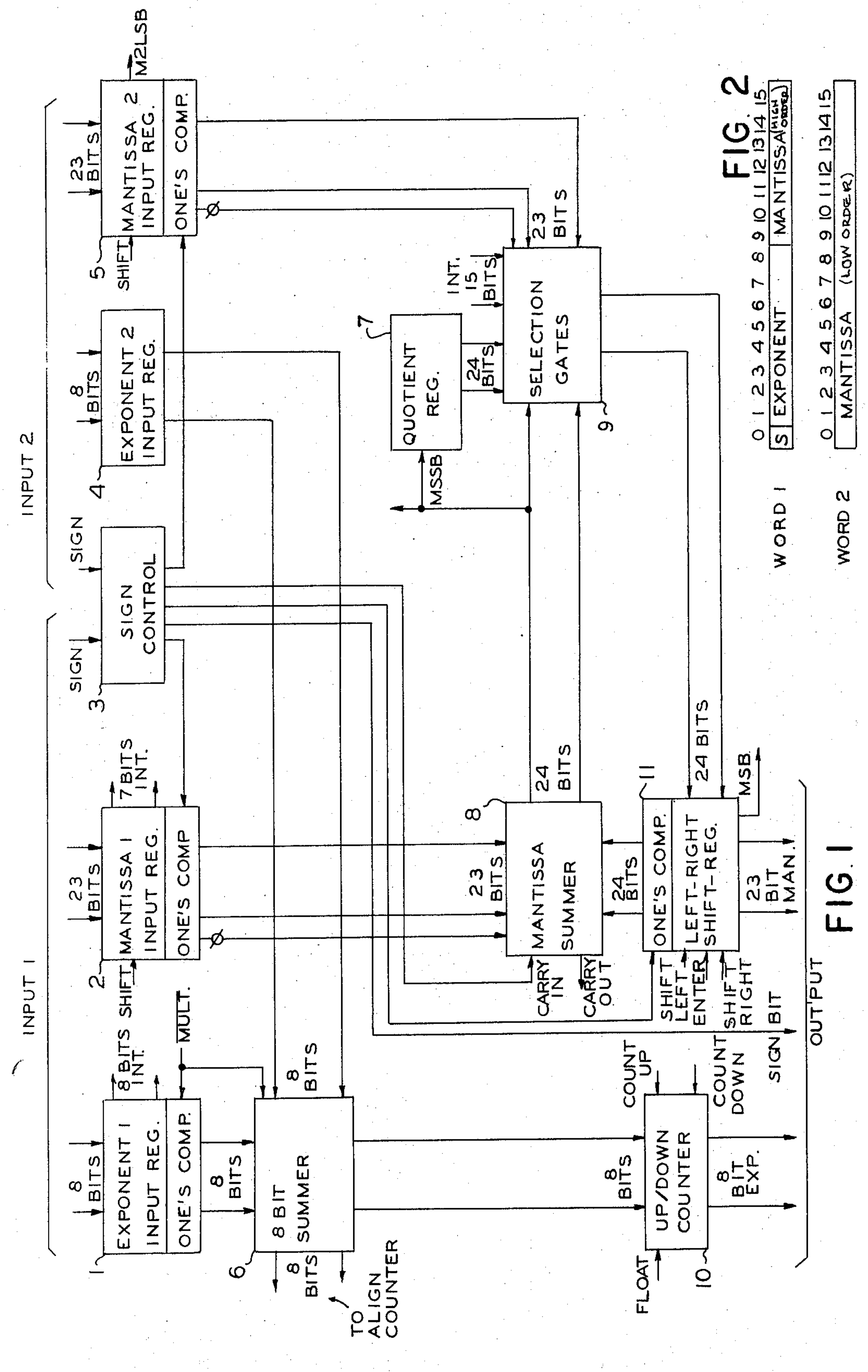
FIG. 1 is a block diagram of a floating point system according to the present invention.
FIG. 2 is a diagram of a floating point number format suitably employed according to the present invention.

Referring to the drawings, and particularly to FIG. 2, the format of the input number is illustrated. The system according to the present invention is adapted to perform arithmetic operations on 32 bit binary floating point numbers. The format of each number comprises a word "one" which includes a sign bit, 8 exponent bits, and 7 higher order mantissa bits, and a word "two" which includes 16 lower order mantissa bits. The format can, of course, be extended by employing further words for yet lower order mantissa bits. In some instances, when an integer is inputted rather than a floating point number, the integer is required to have a 16 bit signed format, with the most significant bit containing the sign. Even though 23 bits of data from the mantissa are ordinarily contained in each floating point number, an additional high order bit is provided throughout the execution of each relevant function, comprising an overflow bit.

Referring now to FIG. 1, inputs 1 and 2, each comprising an aforementioned 32 bit number, are coupled from an input-output unit or the like associated with a computer into respective input registers of the floating point converter according to the illustrated embodiment. The inputs may be received from a computer adapted to accommodate the respective floating point numbers initially in words of computer memory having the word format given. The arithmetic operations in the FIG. 1 system are also directed from the I/O input instructions as hereinafter indicated, and after the desired operation, the floating point answer is outputted via such I/O to the computer. In this manner, the system according to the present invention converts a conventional computer to floating point arithmetic.

The sign bit of input 1 is coupled to sign control register 3, the 8 exponent bits are coupled to input register 1, and the remaining 23 mantissa bits are coupled to input register 2. Similarly, the sign bit of input 2 is applied to sign control register 3, while the eight exponent bits are coupled to register 4 and the 23 mantissa bits are applied to input register 5. Each of the registers 1, 2, 4 and 5 suitably comprises a shift register, while sign control register 3 comprises a pair of bistable circuits as hereinafter indicated. The sign control register 3 determines which, if either, of registers 2 and 5, requires as an output the one's complement of their normal outputs. Each of the registers 1, 2 and 5 can supply either a noninverted or an inverted output in parallel fashion. When the input control lead designated "one's complement" is energized, the inverted output is supplied in parallel. Otherwise the noninverted contents of the register may be outputted. Since both the registers 2 and 5 are shift registers, information stored therein may be shifted right in response to the command input "shift."

Mantissa summer 8 comprises a substantially or nearly instantaneous parallel binary adder which receives as an input thereof the 23 mantissa bits from register 2, as well as a twenti-fourth high order zero bit, which may be received in either noncomplemented or complemented form in accordance with the input from sign control register 3 to the register 2. The second input to summer 8 is received from output left-right shift register 11 in either noncomplemented or complemented form, again depending upon a control input from sign control register 3. The summer 8 adds the two inputs in parallel and may then apply the sum in a parallel manner back into left-right shift register 11 for replacing the previous contents of the latter. Access back into shift register 11 is via selection gate circuitry 9. Selection gate circuitry 9 provides either (1) a parallel path from mantissa summer 8 into left-right shift register 11, (2) a parallel path from quotient register 7 into left-right shift register 11, (3) a parallel input of 15 "integer" bits from registers 1 and 2 in parallel fashion into left-right shift register 11, or (4) a parallel path from mantissa register 5 into left-right shift register 11. The path selected in a particular instance is dependent upon the operation commanded as well as the point in the cycle of timing operations dictated by timing circuitry hereinafter described.

The summer 8 may receive an initial carry input from sign control register 3, and is utilized when taking the two's complement of either, but not both, of the inputs for subtraction purposes. The most significant summer output bit, or MSSB, coupled from the highest order parallel output lead is provided not only to the selection gate circuitry 9 with the rest of the output for input to the left-right shift register 11, but is also coupled as an input to quotient shift register 7.

Left-right shift register 11 comprises the output mantissa register for providing the 23 bit mantissa output in the format according to FIG. 2. The register is, however, a 24 bit register as hereinabove indicated, and can provide either its noninverted or inverted outputs to mantissa summer 8 according to the state of the "one's complement" input from sign control register 3. The register 11 operates as an intermediate data storage register while a function is in progress. Data that is stored in block 11 can be shifted either right or left in accordance with the indicated control supplied thereto.

Quotient register 7 is a serial-in, parallel-out, right shift register in which the quotient for division is serially entered. Upon completion of the dividing function, as hereinafter indicated, the quotient is transferred in parallel fashion through selection gates 9 to left-right shift register 11.

Figure 3A:
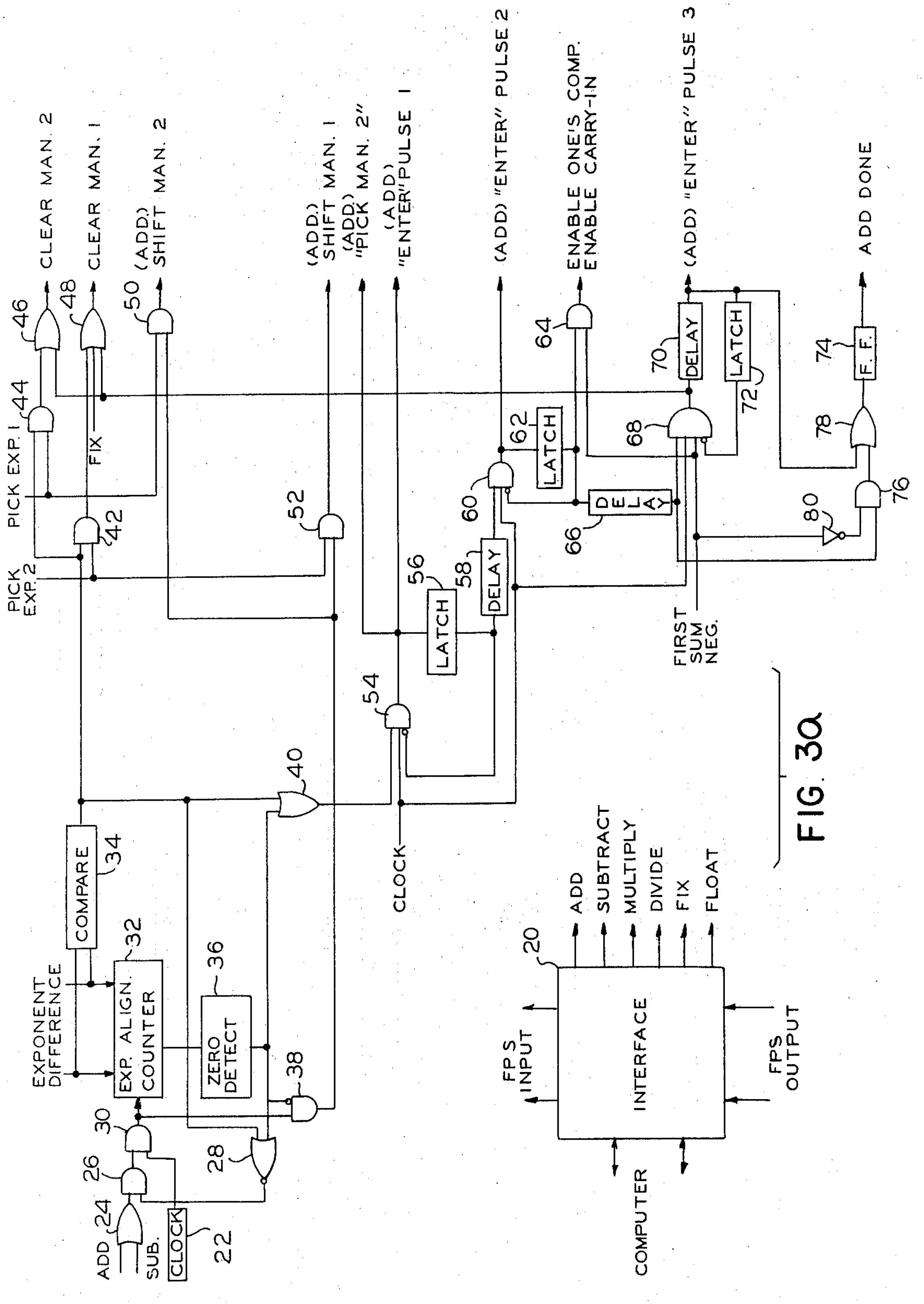
FIG. 3 is a block diagram of timing control circuitry according to the system of the present invention this diagram being subdivided into FIG. 3*a*, FIG. 3*b* and FIG. 3*c* for convenience of illustration.

Summer 6, which also comprises a substantially instantaneous parallel adder, received inputs from register 4 and register 1 wherein the latter may be either noninverted or inverted according to the "one's complement" input applied thereto. Summer 6 is hereinafter described in greater detail and functions in a different manner in accordance with the particular function being carried out. The output thereof is provided in a parallel manner to up/down counter 10. Also, summer 6 may supply an 8 bit parallel output to the alignment counter in FIG. 3, hereinafter more fully described. The primary function of counter 10 is to provide the final value of the exponent, as the mantissa result is shifted either right or left in left-right shift register 11. The final answer is supplied in the FIG. 2 format from sign control register 3, up/down counter 10 (representing the exponent), and left-right shift register 11 (representing the mantissa).

Considering arithmetic operations of the circuit illustrated in the FIG. 1 in block diagram form, addition will be first considered. Since two numbers may not be effectively added unless they are of the same order of magnitude, "alignment" of the exponents, and consequently the mantissas, is sometimes a necessary prerequisite. To accomplish exponent alignment, the negative of the absolute difference of the exponents is provided the timing control and specifically the alignment counter in FIG. 3 from summer 6. The control counts this difference up to zero, and each "up" count is supplied to shift input either in register 2 or register 5 for providing a corresponding right shift in the mantissa associated with the smaller exponent. Summer 6 in this case provides counter 10 with the value of the larger of the two exponents for output. The contents of register 5 are inputted to register 11 via gating circuitry 9. If a difference in signs between the two inputs is detected in block 3, the one's complement of the mantissa whose sign is negative is directed by causing the appropriate one of registers 2 and 5 to supply an inverted output. Additionally, the carry-in input of summer 8 is enabled in the latter case, the effective result of which is that the two's complement of the negative mantissa will be added to the positive mantissa. After alignment and complementing, if the latter is necessary, addition proceeds, and gating circuitry 9 gates the sum from summer 8 back into register 11 in feedback fashion to replace the previous information stored therein and immediately provide the mantissa output. If a difference in sign occurs as detected by register 3, and also if the negative mantissa has the greater absolute value, the resultant sum will be a negative number in two's complement form. The two's complement of this result must be obtained and the sign of the final entry must be negative. In such case, the timing control in FIG. 3 causes both inputs to be cleared from registers 1, 2, 4 and 5 and, since a form of their sum will be stored in register 11, the one's complement of this sum is inputted to summer 8 and the carry-in input is enabled. At this time, the other input to summer 8 (from register 2) will be zero. The sum from summer 8 is then gated via gate circuitry 9 back into register 11 for replacing the former information.

Subtraction causes the sign of the operand, or the sign of the mantissa 1 information, to be complemented. Addition is then initiated and proceeds as described above.

In multiplication, the contents of register 2 are treated as operand and the contents of register 5 as operator. The least significant bit of the multiplier as derived from the lead marked M2LSB is tested in the timing control. If it is equal to one, the multiplicand in register 2 is added to a partial product developed in register 11 (initially set to zero) with the aid of mantissa summer 8 via gating circuitry 9. If the output of register 5 marked M2LSB is zero, no new partial sum is gated by gate circuitry 9 into register 11. In either case, the developing product is then shifted right in register 11, after which the multiplier in register 5 is also shifted right to obtain the subsequent least significant bit on lead M2LSB for evaluation in the timing control of FIG. 3. Multiplication is complete after each of 23 multiplier bits have been thus evaluated and the procedure for each bit has been concluded. The exponent is obtained by adding the exponent of the multiplicand from register 1 to the exponent of the multiplier in register 4 in the exponent summer 6, and providing the output to counter 10.

Division requires that the mantissa of the divisor be greater than the mantissa of the dividend to provide a fractional result. An initial examination of the relative magnitudes is brought about by subtracting the divisor from the dividend by means of the above subtraction procedure and allowing the carry-out of the summer 8 to enable or inhibit respectively only the first of a plurality of dividend left shifts described below. If that shift is inhibited, the exponent of the unnormalized quotient, which will have been determined by this time, is incremented so that the algorithm remains functionally valid. The effect of this procedure is the same as that of dividing the mantissa of the dividend by two and incrementing its exponent, except that no information precision is lost in the procedure actually employed.

Proceeding with the division function, the contents of the dividend from register 5 are placed in register 11 via selection gating circuitry 9. After the initial sequence described above is complete, whereby a fractional answer is assured, the dividend is shifted left in register 11. the divisor from register 2 is then subtracted from the dividend by providing the one's complement output from register 2, and a carry-in input to mantissa summer 8. The most significant summer bit output, the output marked MSSB, is then employed as follows. The MSSB is inverted in quotient register 7 and serially received therewithin. If the MSSB is one, indicating that a negative sum has occurred, the contents of register 11 are not affected. That is, the "old data" in left-right shift register 11 is undisturbed. If the MSSB is zero, the contents of register 11 are replaced with the summer output routed via gating circuitry 9. The new contents of register 11 are then treated as a new dividend.

Except for the initial transfer of data from register 5 to register 11, the above procedure, including successive left shifts, is repeated until a 23 bit quotient has been obtained. Upon completion of division, the quotient contained in quotient register 7 and which has bit shifted to the right in each cycle, is transferred through selection gate 9 into left-right shift register 11. The exponent of the quotient is obtained by subtracting the exponent of the divisor in register 1 from the exponent of the dividend in register 4 by means of exponent summer 6. Division requires the loading of counter 10 with the exponent of the unnormalized result before the division function itself may proceed. This is effected in the case of the division function so that the above division initiation sequence can be implemented, i.e., such that a fractional answer is assured.

In some instances, the memory of the computer to which the present system is coupled may store an integer which it is desired to change to a floating point number in order to accomplish floating point operations. This function will be designated as "floating an integer," or merely "float." The integer, as hereinbefore mentioned, comprises a 16 bit signed format, with the most significant bit containing the sign. The integer is supplied as input 1, with the sign bit being coupled to sign control register 3. The 15 lower significant bits comprising the number are stored in registers 1 and 2, with the register 1 receiving the higher order 8 bits, and register 2 receiving the seven lower order bits. The contents of these registers are coupled from the outputs marked "INT" to the similarly designated "INT" inputs of selection gating circuitry 9, and if "float" is in progress, this data is latched in the first 15 bits of left-right shift register 11, being received therein via gating circuitry 9. The contents of register 11 may now be treated as an unnormalized fraction if an exponent adjustment is made to compensate for the effective displacement of the binary point. It will be noted that a normal location of the decimal point for floating point arithmetic is just to the left of the most significant mantissa bit. Therefore, the most significant bit of a 15 bit integer represents $2^{14}$. Since the integer iw stored in register 11 so that the most significant bit is in the $2^0$ position of the unnormalized fraction, the exponent of this fraction must be 14. Consequently, counter 10 is provided with a preset value of 14 via its "float" input when the function "float" occurs.

In the case of either floating an integer, or in the case of any of the other arithmetic functions hereinbefore described, the result will ordinarily be an unnormalized number, i.e., wherein the most significant bit of a mantissa is other than immediately to the right of the decimal point. Consequently, after the function has been carried out, the contents of counter 10 and register 11 are changed to provide the properly normalized floating point number. The normalization timing control in FIG. 3 causes counter 10 to be loaded with the exponent of the unnormalized results from summer 6 for the add, subtract or multiply functions. The divide and float functions effect exponent loading slightly differently as described above.

For the express purpose of providing a non-carry bit for overflow, all operations which require normalization utilize the 23 lower significant bits of both summer 8 and register 11 while carrying out their execution. Since overflow may occur, however, it is desirable to reposition the implied binary point from its operational position, just to the right of the most significant, or twenty-fourth, bit, to the normalization position just to the left of the most significant bit. Then the 23 most significant bits are employed as an answer. It is assumed the decimal point has shifted right by 1 bit, and the exponent is incremented by one in up/down counter 10, so that the most significant bit for output in register 11 now represents $2^{-1}$ rather than $2^0$, which was its value before normalization. By definition, a normalized mantissa of a non-zero binary floating point number is such that its value is greater than or equal to one-half and is less than one. Since the most significant bit of the mantissa in register 11 now represents $2^{-1}$, that is, one-half, the above definition can be satisfied by shifting the contents of register 11 left until, or unless, a bit appears in the most significant bit location of register 11. Concomitantly, the exponent in counter 10 is decremented for each left shift. Thus, the contents of register 11 are shifted left until a bit appears in the most significant bit position, providing an output on the lead marked MSB to the timing control circuit of FIG. 3, while the counter 10 is decremented for each left shift. When normalization is complete, the information in registers 10 and 11, as well as the sign bit output from register 3, can be supplied to the computer. An exception to the above procedure is a function called "fix," in which further manipulation is required.

The function "fix" refers to the fixing of a floating point number, i.e., the transformation of a floating point number to an integer. The floating point number in this case is suitably derived from computer memory and is supplied as input 2 with its sign coupled to sign control register 3, its exponent coupled to input register 4, and its mantissa loaded into input register 5. The initiation of "fix" initiates an "add" instruction. Also a clear pulse for input 1 is provided so the add instruction results in adding input 2 to zero. As a result, the input 2 is loaded into register 11 and normalized, and the thus normalized result may now be operated upon as follows: the exponent of the floating point number as resides in counter 10 is tested by the timing control. If it is zero or negative, the contents of register 11 are set to zero, since the floating point number is less than one, and "fix" is complete.

If the contents of counter 10 are not zero or negative, the contents of register 11 are shifted eight places to the right, and the counter 10 is incremented by eight. This places the 15 most significant bits of the floating point number mantissa in bit locations 9 through 23 of register 11. Subsequently, bit 9 through 23 will contain the unsigned portion of the 15 bit integer result. The timing control now enables detection of an exponent greater than 14. If the exponent is greater than 14, the value of the floating point number, whose most significant bit represents one-half, must be greater than or equal to $2^{15-1}$, or the maximum floating point number that can be represented by the system. Consequently, the most significant bit of the floating point number has thus been placed in the most significant bit position of the associated integer. No further shifts are required and "fix" is complete. If the exponent as detected in counter 10 is less than or equal to 14, at least one right shift, but no more than 14 right shifts, will be required in register 11. The actual number of required right shifts is obtained by inhibiting a clock train of 15 pulses for the number of pulses necessary to count the exponent in counter 10 to zero. The remaining pulses are then applied as right shift commands to register 11. Thus, if the exponent was 13, the counter 10 will be counted down by the first 13 clock pulses, and then the contents of register 11 will be shifted twice to the right. Upon execution of the last shift, "fix" is complete.

Figures 4, 7:
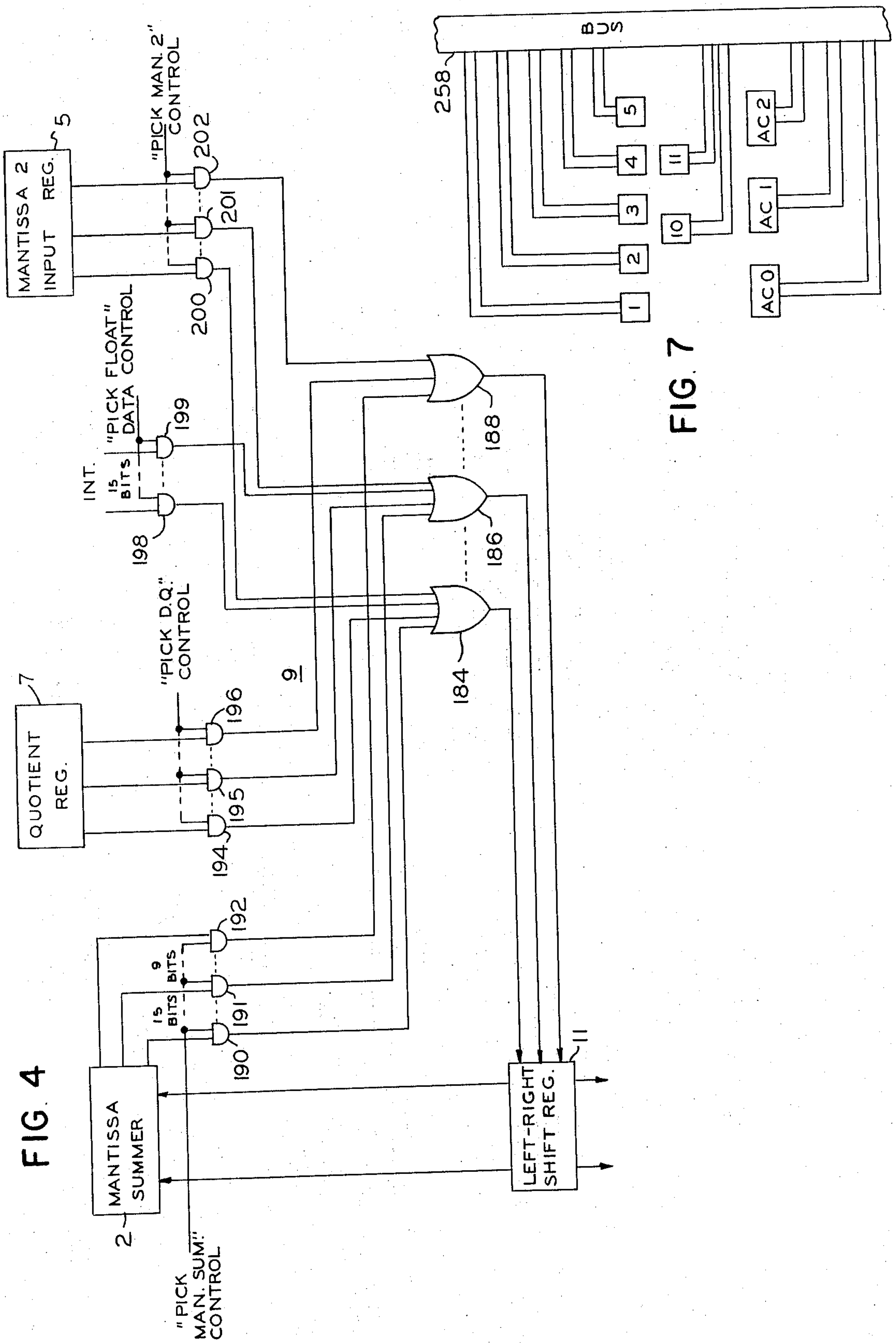
FIG. 4 is a diagram, partially in block diagram form and partially schematic, more particularly illustrating a computational loop circuit including gating circuitry according to the present invention.
FIG. 7 illustrates a system extension.

Referring now to FIG. 4, illustrating the computational loop and particularly gating means 9 in greater detail, it is seen that such gating means selects the parallel output of the mantissa summer 2, quotient register 7, mantissa 2 input register 5, or the integer input from registers 1 and 2. The selection is made by control inputs designated "pick man. sum" control for enabling and-gates 190 through 192, "pick DQ" control for enabling and-gates 194 through 196, "pick float data" control for enabling and-gates 198–199, and "pick man. 2" control for enabling and-gates 200 through 202. In each case it will be understood that 24 gates will in general be employed, except for the case of the "INT" input, comprising only 15 bits wherein 15 gates are employed. Gates 190 through 192 gate the output of mantissa summer 2 into or-gates 184, 186, 188 while gates 194 through 196 gate the output of quotient register 7 into the same or-gates. Similarly, gates 198, 199 gate the integer into or-gates 184, 186, 188, and gates 200 through 202 gate the contents of register 5 into the or-gates. Three or-gates are illustrated by way of example in this instance, it being understood that the higher order or-gates 184 through 186 receive four inputs, including the "INT" input, while the lower order or-gates receive only three inputs. The or-gates 184, 186, 188 complete the computational loop back into the left-right shift register 11. In the case of a given selected function, the contents of left-right shift register 11 are delivered to mantissa summer 2, and the new resultant from mantissa summer 2 is gated back into left-right shift register 11 in one operating cycle. Also for a multicycle operation such as multiply and divide, each elementary component of a calculation returns information to left-right shift register 11 in one cycle and no inputs or outputs to further memory means is required.

Figure 5:
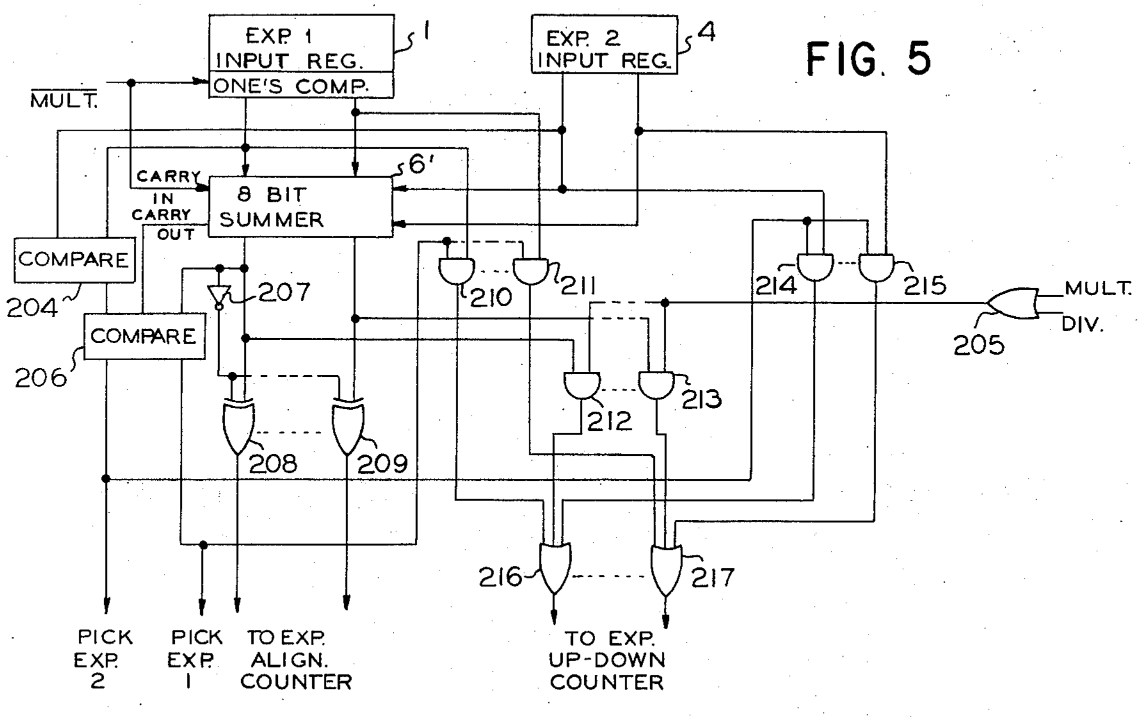
FIG. 5 is a diagram illustrating exponent summer circuitry employed according to the present invention.

Referring now to FIG. 5, the 8 bit exponent summer 6 is illustrated in greater detail. This summer includes a parallel adder, here designated 6', receiving the inputs of registers 1 and 4 and providing the sum thereof to exclusive-or-gates 208 and 209 which either complement, that is provide the inverse of, the sum from the summer, or alternatively provide the noninverted sum, under the control of inverter 207 connected to the most significant bit or sign bit output of summer 6'. The outputs of gates 208, 209, representing eight lines and eight gates in the actually constructed device, deliver an output to the exponent alignment counter in FIG. 3. The most significant exponent bit of the sum indicates the sign of the exponent.

Comparison circuit 204 compares the signs, i.e., the most significant bits of the exponents from registers 1 and 2. If the signs are the same, the larger of the two exponents can be determined from the most significant bit of the exponent sum. Then, if the most significant bit is one, this indicates a negative sum which describes exponent 1 as the larger. If the signs are not the same, the carry-out from summer 6' is employed to determine the larger exponent. Compare circuit 204 controls a second compare circuit 206 in accordance with the likeness or unlikeness of the exponent signs, as just described, and selects either the most significant bit or the carry-out from summer 6' for selecting or "picking" the larger of the two exponents. Thus, compare circuit 206 provides either a "pick exponent 1" output or a "pick exponent 2" output. These outputs are employed as hereinafter more fully described. Furthermore, the "pick exponent 1" output enables gates 210, 211 to gate the output of register 1 into or-gates 216, 217 for delivery to exponent up/down counter 10 in FIG. 1. If on the other hand, exponent 2 is larger, the "pick exponent 2" output enables gates 214, 215 for supplying the output of register 4 to or-gates 216, 217. If, via gate 205, multiply or divide is selected, then or-gates 212, 213 are enabled for delivering the output of the 8 bit summer 6' to orgates 216, 217. In the case of the multiply function, the exponents are merely added in 8 bit summer 6' as hereinbefore mentioned. In such case, the $\overline{\text{MULT}}$. input is down, whereby the contents of register 1 are not complemented when entered into summer 6', and no carry-in is supplied for generating the two's complement. For any other function, the $\overline{\text{MULT}}$. input will be up, whereby summer 6' actually provides a subtraction for subsequent delivery to the alignment counter, or for delivery to or-gates 216, 217 in the case of division.

Figure 6:
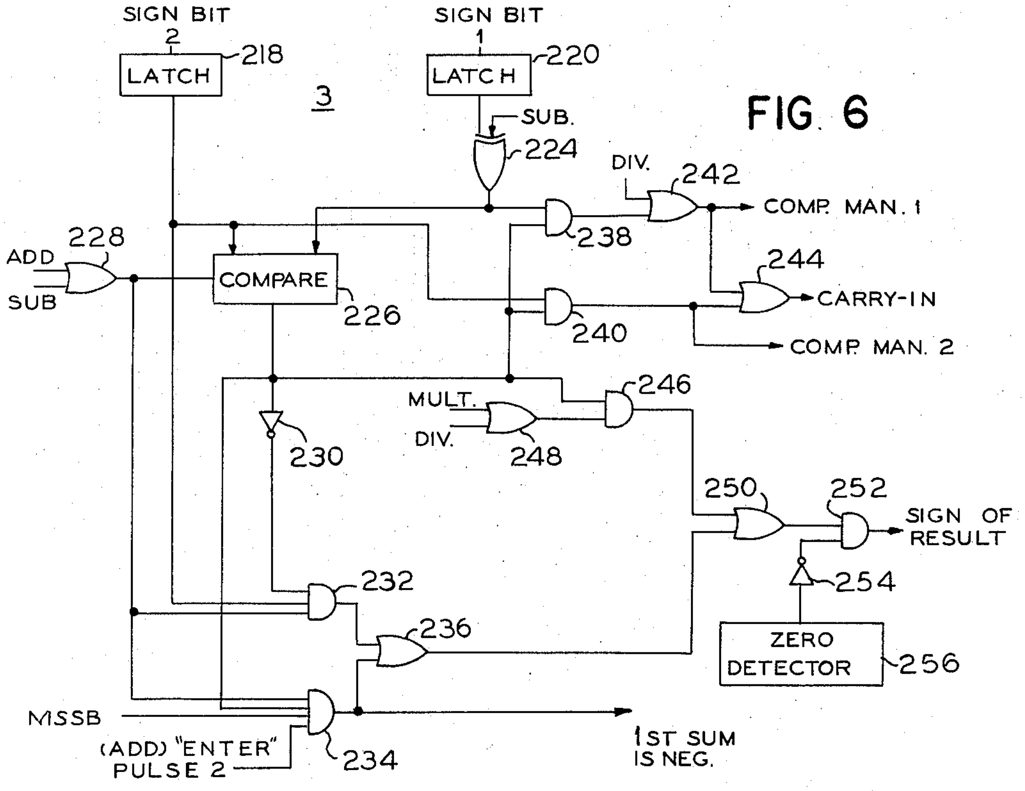
FIG. 6 is a diagram illustrating sign control register circuitry employed according to the present invention.

Referring now to FIG. 6, sign control register 3 is illustrated in greater detail. This register comprises a pair of flip-flops or latches 218 and 220, respectively receiving the sign bit from input 2 and the sign bit from input 1. In the case of a subtract command, exclusive-or-gate 224 inverts the contents of latch 220, but otherwise the output of latch 220 is not inverted. In the instance of either latch 218 or 220, an "up" output is provided for the instance where the sign is negative. In the case of addition or subtraction, or-gate 228 is energized for enabling comparison circuit 226 which provides an output in the case where the inputs differ, i.e., where the signs differ. If the signs differ, the output of comparison circuit 226 enables and-gates 238 and 240. Gate 240 will provide an output if the signs differ and the sign bit 2 is negative. Gate 238 will provide an output if the signs differ and the sign bit 1 is negative (as inverted or not inverted by gate 224 as the case may be). If gate 238 supplies an output or if division is commanded, or-gate 242 is energized whereby a complement mantissa 1 control is supplied to register 2. If gate 240 supplies an output, a complement mantissa 2 output is provided to register 5. Additionally, if either mantissa is complemented, or-gate 244 provides an output causing a carry-in to mantissa summer 8 whereby the two's complement of the respective mantissa is in effect entered into mantissa summer 8 and a subtraction will take place.

If both sign bits are negative, and add or subtract is commanded, and-gate 232 will be energized supplying an input to or-gate 236, indicating the sign of the answer is negative. If an MSSB is generated from summer 8 indicating the mantissa sum is negative, and the signs differ, and add or subtract is commanded, and if an add "ENTER" pulse 2 is commanded, gate 234 is energized and provides a first-sum-is-negative output, while also operating or-gate 236. Or-gate 236 supplies a sign-indicating input to or-gate 250 with a remaining input being provided by and-gate 246. And-gate 246 receives one input from comparison circuit 226, and a second input from or-gate 248 receiving multiply and divide inputs. If the function multiply or divide is commanded, then, and if the signs differ, and-gate 246 supplies an input for energizing or-gate 250 which causes and-gate 252 to generate an indication that the sign of the result is negative, unless the result is zero, as detected by zero detector 256. Similarly, in the case of add or subtract, if the first sum is negative, the sign of the result is indicated as negative unless zero.

Summarizing the sign of result considerations, the sign of the result is negative for a multiply or divide command only if the input sign bits differ. The sign of the result is negative for add or subtract commands (a) if both mantissa sign bits are negative, or (b) if the signs differ and the MSSB of the mantissa sum is one (i.e., the sum is negative). The sign of the result is always positive if the result of the arithmetic operation is zero.

Referring now to FIGS. **3*a*, 3*b* and 3*c* illustrating timing control circuitry in functional block diagram form, the commands add, subtract, multiply, divide, fix, float are received from computer interface or input-output unit 20 which provides the inputs indicated in FIG. 1 as received from computer memory, and which channels the output of FIG. 1 circuitry back into computer memory. Instructions received from the computer result in one of the output controls add, subtract, etc., as further designated at various locations in FIGS. 3*a*, 3*b* and 3*c*. The last mentioned figures as taken together are sometimes hereinafter referred to as FIG. 3** as a matter of convenience.

A clock pulse generator 22, suitably a 20 megathertz rate clock pulse generator, supplies the output designated "clock" variously applied in FIG. 3 and also provides its clock input to and-gate 30 which receives a second input from and-gate 26. And-gate 26 receives a first input from or-gate 24 when add or subtract is commanded, and a second input from nor-gate 28. The output of and-gate 30 is applied to exponent alignment counter 32 wherein clock pulses are counted after such exponent alignment counter is preset with the exponent difference received from gates 208 and 209 in FIG. 5. Compare circuit 34 first determines if the exponent difference exceeds the number of allowable mantissa bits, i.e., 24 in this case, and if so, an output is provided from inverter 28 which inhibits the counting operation. Otherwise, counting proceeds to zero, as detected by zero detector 36 which inhibits gate 38 theretofore receiving the stream of clock pulses for delivery to gates 50 and 52, respectively energized by the "pick exponent 1" and "pick exponent 2" commands from FIG. 5. Zero detector 36 also inhibits and-gate 26 via nor-gate 28 so the counter 32 will stop at zero. And-gate 50 produces a shift mantissa 2 command, for application to register 5 while and-gate 52 provides a shift mantissa 1 command for application to register 2. In the instance where the exponent difference exceeds 24, comparison circuit 34 energizes either gate 42 or gate 44, respectively providing inputs to or-gates 46 and 48 for clearing a respective mantissa from register 5 or register 2 (as well as the respective exponent register). At either the zero detect, or in the event the exponent exceeds 24, or-gate 40 is energized, providing one input to and-gate 54. A clock input is provided and-gate 54 and latch 56 is toggled thereby for inhibiting gate 54, the gate having provided a pulse as a "pick man. 2" control command for application to the FIG. 4 circuitry whereby the mantissa 2 will be gated into register 11. Also, an output of gate 54 provides an "ENTER" pulse 1 for application to register 11 whereby the latter will receive mantissa 2.

After a delay produced by delay means 58, and-gate 60 is energized for receiving a clock pulse for toggling latch 62, which in turn inhibits gate 60. Meanwhile, an add "ENTER" pulse 2 is provided as an enter-pulse of the shift register 11 and also add "pick man. sum" control line is energized in FIG. 8 whereby the sum produced when the previous information was entered into register 11 will be delivered via gating means 9 back into register 11. If the first sum was not negative, as indicated on the lead designated "first sum is negative" from FIG. 6, and-gate 76 will produce an output for or-gate 78, the latter toggling flip-flop 74 providing an "add done" output for the interface 20. If, on the other hand, a difference in sign occurred and also the "negative" mantissa was the greater absolute value, the resultant sum is a negative number in two's complement form. As hereinbefore indicated, in such case both inputs are cleared from their respective registers, as a form of their sum is stored in register 11, and the one's complement of this sum is placed in summer 8 with the carry-in enabled. The positive representation of the sum is then redirected to register 11 for subsequent normalization and outputting. If the "first sum is negative" input is received, and-gate 64 is enabled to enable the one's complement output from register 11, and the carry-in of summer 8 is enabled. Also gate 68 is operated via delay means 66 which clears registers 5, 4, 2 and 1 by means of gates 46 and 48, and latch 72 is toggled by way of delay means 70 inhibiting gate 68. The output of delay means 70 supplies an add "ENTER" pulse 3 whereby the result of the complementing is returned to register 11. Also the output of means 70 operates the add "pick man. sum" control in FIG. 8 to provide the proper path for the sum back into register 11. Further, or-gate 78 receives an input for toggling flip-flop 74 and supplying an "add done" signal to the interface 20.

It will be noted that subtract is substantially the same as add, with the mantissa sign change brought about by gate 224 in FIG. 6. Refer to FIG. 3*c* re multiplication.

In the case of multiplication, a command so designated operates cycle counter 86 in FIG. 3*c* which is preset thereby to a count of 23 such that 23 adding cycles will in effect be commanded. However, the contents of register 5 are not gated into shift register 11, but rather the M2LSB output or the least significant bit of mantissa 2 is tested via gate 88 and if such bit is a one, gate 88 provides a multiplication "ENTER" pulse to left-right shift register 11. Successive outputs from gate 82 toggle flip-flop 90 for successively enabling gates 88 and 92, the latter supplying right shift pulses for register 5, and also counting cycle counter 86 down by one. The process proceeds to accomplish the multiplication function as hereinbefore described. Meanwhile, the "pick man. sum" control will now also be enrgized in FIG. 8. When cycle counter 86 reaches zero, a "multiply done" signal is applied to the interface and gate 86 is inhibited via inverter 84.

In the case of a division command, cycle counter 94 is preset to 23. Also, one-shot multivibrator 96 is triggered to supply a division "ENTER" pulse 1 to register 11 as well as a "pick man. 2" control such that mantissa 2 from register 5 is initially entered into register 11 via gating circuitry 9. A flip-flop 100 is also triggered which enables gate 102, and a clock pulse is gated through gate 102 for supplying a triggering input to flip-flop 108. If a carry-out occurs from the summer, gate 110 is operated before the flip-flop provides an inhibiting output via latch 109 whereby a first left shift pulse as derived from gate 112 is inhibited. Otherwise, left shift pulses are produced from gate 112 in response to clock pulses and cause left shifts in register 11 in accordance with the division process. Once operated, latch 109 maintains its condition until the end of the division function.

Flip-flop 114 is successively toggled from the output of gate 102 and successively enables gates 112 and 116, the latter providing an input to gate 118 causing successive division "ENTER" inputs to register 11 in accordance with an MSSB output from summer 8. At the same time, a quotient clock output is produced by gate 116 for shifting the contents of quotient register 7 by one place. Each time gate 116 is operated, the cycle counter 94 is counted down by one via delay means 124. Furthermore, the output of gate 116 energizes gates 122 in the absence of an MSSB, whereby one-shot multivibrator 126 is triggered supplying a division "up" count to counter 10 via delay means 128 and flip-flop 129. The "up" count is produced only once, being then inhibited via inverter 127. After 23 cycles, cycle counter 94 will be counted to zero, and gate 102 will be inhibited via inverter 98. Also one-shot multivibrator 104 will be operated which will energize the "pick division quotient" control in FIG. 4 whereby the contents of quotient register 7 will be entered into register 11. An "ENTER" input is also directed to register 11. Flip-flop 106 is operated from one-shot multivibrator 104, and the output of flip-flop 106 supplies a "division done" indication to the interface 20 via the FIG. 3*b* circuitry. In the present system, flip-flops are reset after an arithmetic function.

Figure 3B:
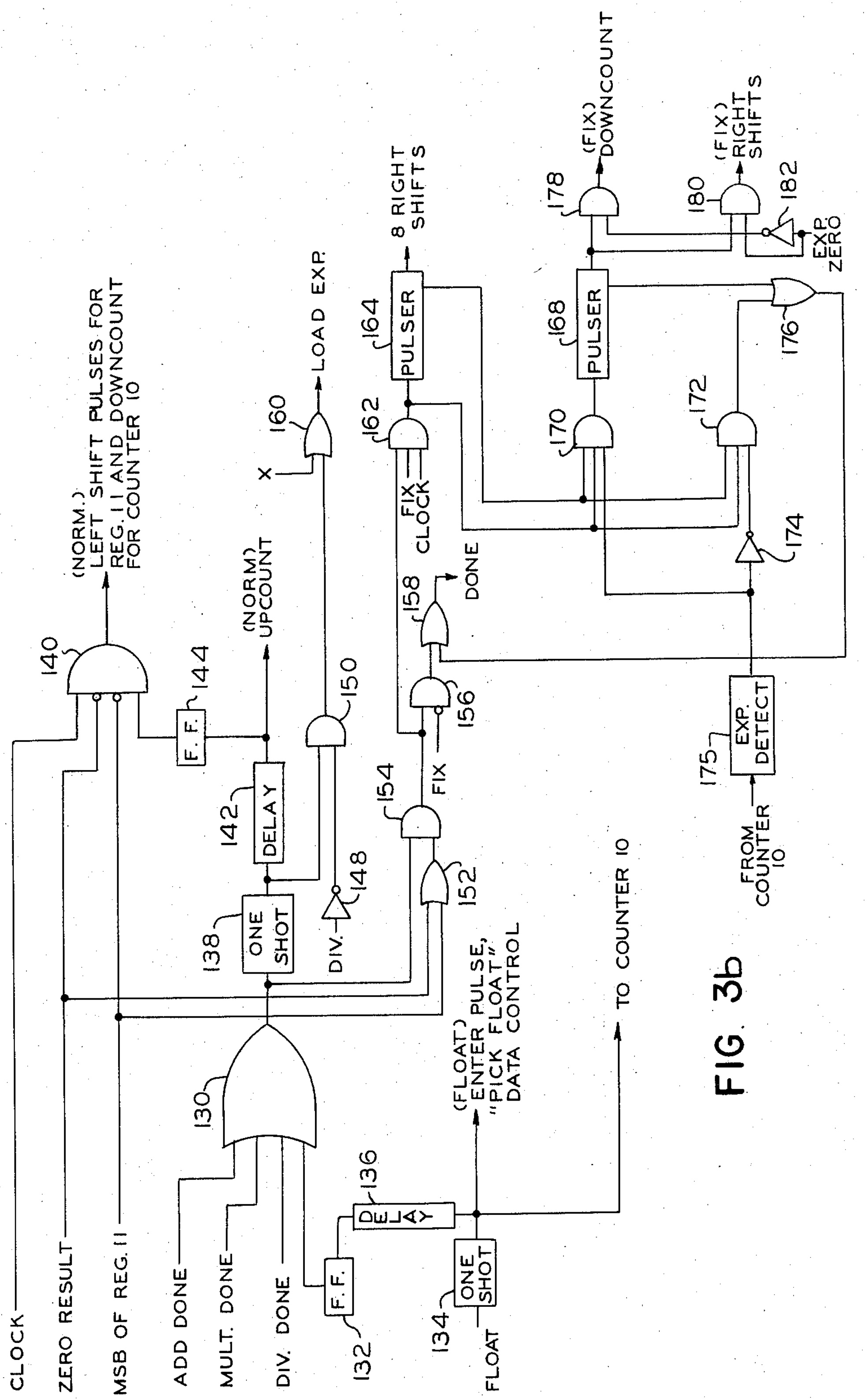
Figure 3C:
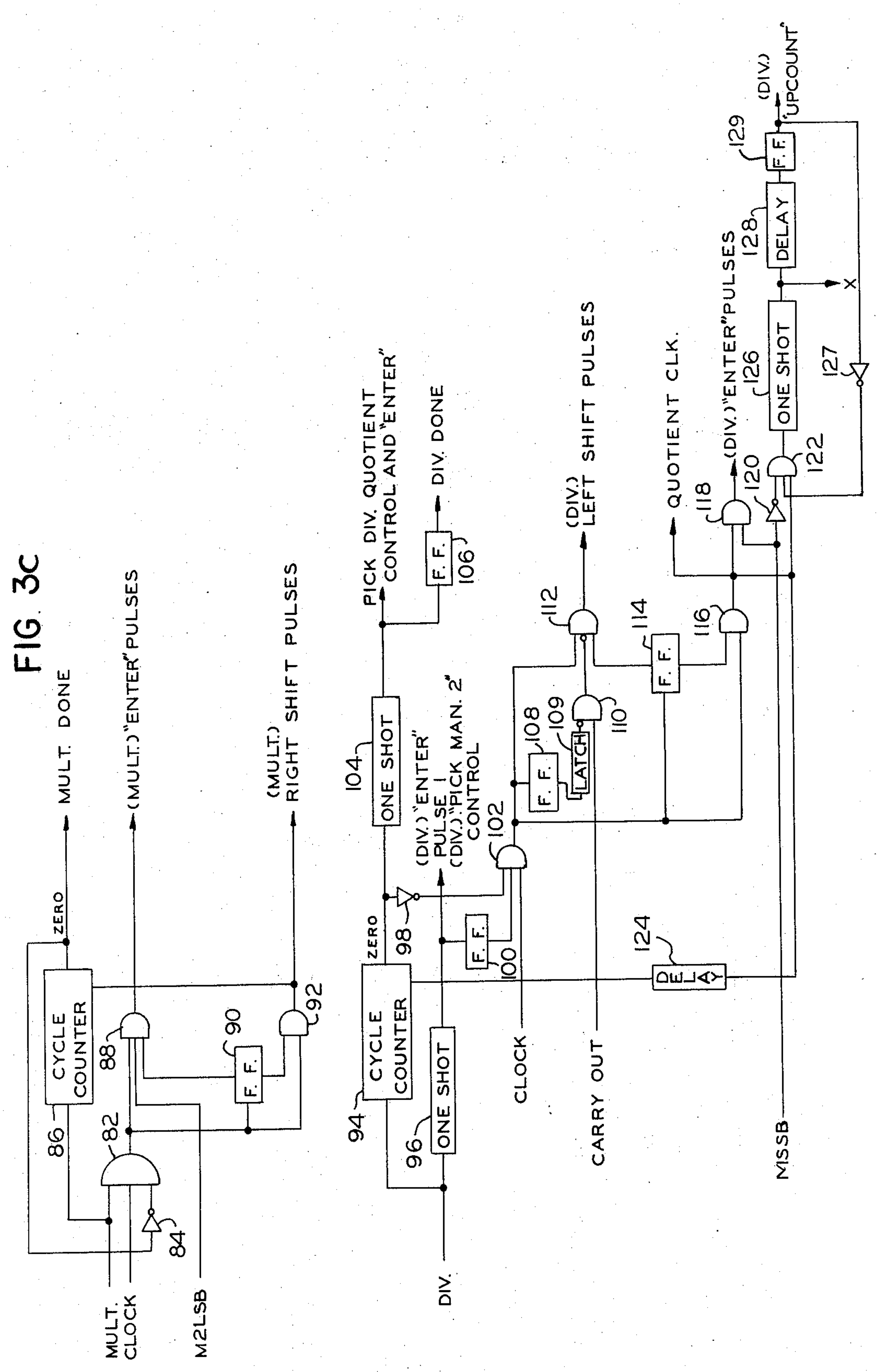

Turning now to FIG. 3*b*, circuitry for timing normalization, fix and float will be considered. Gate 40 receives a clock input, a zero result inhibiting input, the MSB of register 11 as an inhibiting input, and the output of a flip-flop 144. The output of gate 40 is employed in normalization for providing left shift pulses to register 11. Normalization takes place when an arithmetic function is completed, e.g., or-gate 130 is energized by the "add done," "multiplication done," or "division done" indication with subtraction included in the "add done" indication. The same is also energized by the float command as hereinafter indicated. The output of or-gate 130 operates one-shot multivibrator 138 which toggles flip-flop 144 via delay means 142 to energize gate 140 and supply left shift pulses for register 11. "Up" count pulses for counter 10 are also supplied at the output of delay means 142. When one-shot multivibrator 138 is operated, the exponent from summer 6 is loaded into counter 10 via operation of or-gate 160. However, the output of one-shot multivibrator 138 is applied via and-gate 150, which is inhibited from inverter 148 in the case of division, a load exponent command having already been received on the lead marked "X" from the one-shot multivibrator 126 in FIG. 3*a* earlier in the division procedure.

If either the MSB of register 11 is one, or a zero result is present, or-gate 152 in combination with an output of or-gate 130 operates gate 154 which, in the absence of a "fix" command, energizes and-gate 156 to provide a "done" indication to the interface via or-gate 158.

Also, the output of and-gate 154 is applied to a gate 162 adapted to receive a "fix" command and a clock pulse input for supplying triggering for pulser 164. For the "fix" operation, the interface 20 also initially brings about an addition, with mantissa 1 cleared from register 2 by means of a "fix" command applied to gate 48. Pulser 164 is adapted to supply eight output pulses when triggered and these outputs are supplied as eight right shift pulses to register 11. When pulser 164 has completed its operation, it supplies an enabling output to and-gates 170 and 172 which, with the output of and-gate 162, supply either an input to or-gate 176 or an input to pulser 168. Or-gate 176 is energized in the event an improper exponent is present and detected by exponent detector 175, i.e., an exponent greater than 15 or less than one, and a "done" indication is given by gate 158. If the exponent is proper, pulser 168 produces 15 pulses, first delivered via gate 178 for down-counting counter 10 until the contents thereof are detected as zero, whereby gate 178 is disabled and gate 180 is enabled by way of inverter 182. Thereupon, right shift pulses are supplied register 11 from gate 180.

In the instance of the float command, one-shot multivibrator 134 is triggered to provide an output pulse employed as a float "ENTER" pulse for register 11. Also, the "pick float data" control is energized, and a 14 is loaded into counter 10 as mentioned. The output of one-shot multivibrator 134 is also applied via delay means 136 to flip-flop 132 which operates gate 130 and initiates normalization.

Figure 8:
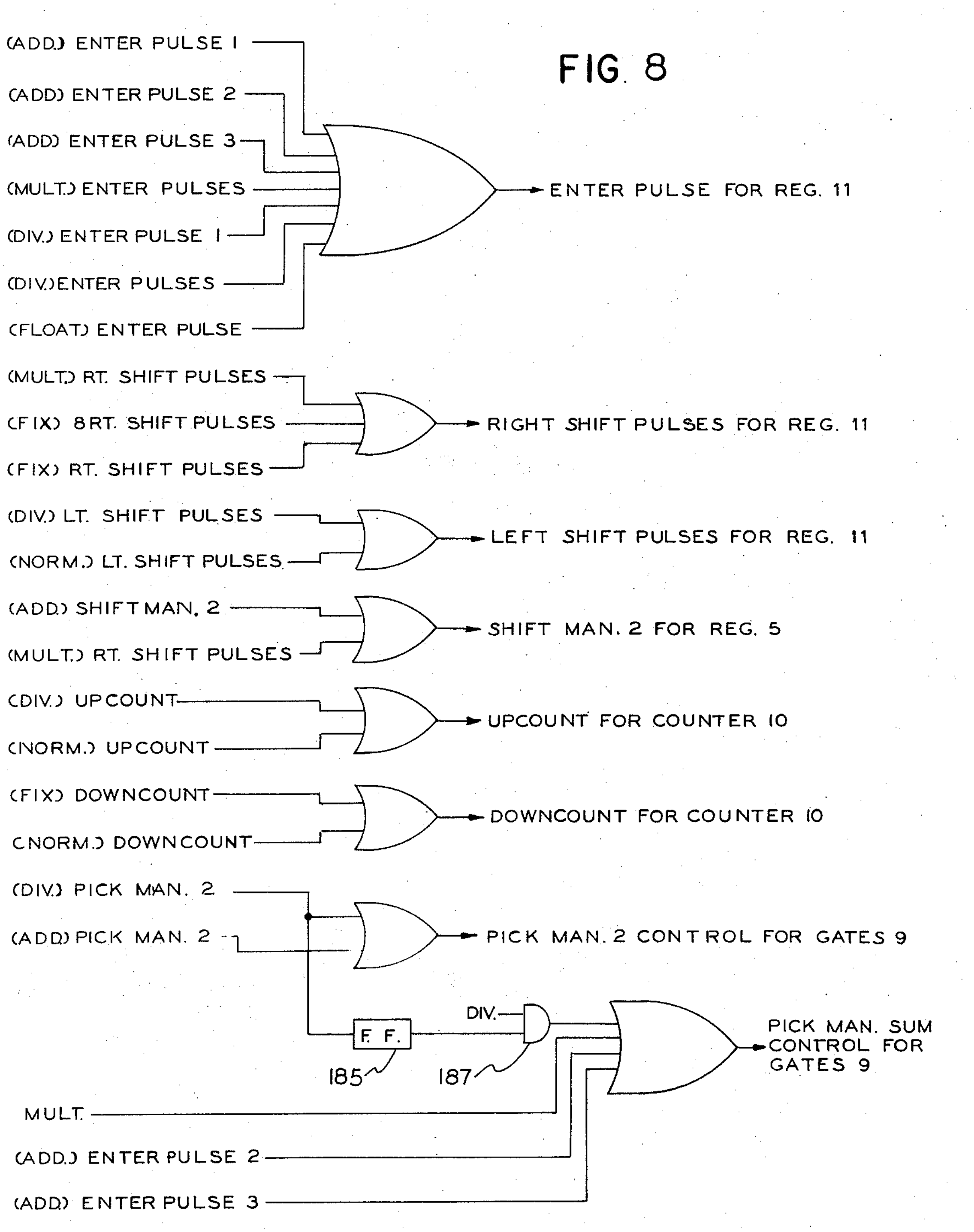
FIG. 8 illustrates system gating circuitry.

Referring to FIG. 8, gating is illustrated for the collection of certain control pulses for accomplishing entrance and shifting of data in register 11, the up-and-down counting for counter 10, the shift mantissa 2 control, the "pick man. 2" control, and the "pick man. sum" control. The diagram is self-explanatory except for the provision of a flip-flop 185 between division "pick man. 2" control input and an and-gate 187 delivering an output to the or-gate supplying the "pick man. sum" control. Gate 187 also receives a division command. The first division "ENTER" pulse 1 causes data to be entered from register 5 into register 11 via gating means 9. Then, the output of the mantissa summer is re-entered into register 11 via gating means 9.

Referring to FIG. 7, a further embodiment according to the present invention is illustrated for connecting components 1 through 5 and 10, 11 to a bus 258 for coupling to a computer interface of the like, and for also coupling to temporary storage registers ACO, AC1 and AC2. These registers may be employed for storing the result of addition, subtraction, multiplication or division for re-entry back into the system inputs without inputting and outputting information from the computer itself. Thus, a complex series of calculations may be completed with only one pair of input data received from the computer, and the resultant returned to the computer.

While we have shown and described a preferred embodiment of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. A floating point system adapted for coupling to a computer for providing a plurality of floating point arithmetic operations, said system comprising:

first exponent and mantissa input means, second exponent and mantissa input means, an output shift register means for storing and providing the mantissa output of said system, a parallel adder coupled for receiving an output of said output shift register means and for receiving a first input mantissa from said first mantissa input means and for supplying the sum of the two, a quotient register for receiving and storing a most significant bit of the output of said adder, and gating means forming a loop circuit with said adder and said output shift register for selectively gating the output of said adder, the output of said quotient register, and the output of said second mantissa input means into said output shift register means.

2. The system according to claim 1 further including means under the control of the sign of respective inputs and the function to be carried out for selectively complementing the output of said mantissa input means as applied respectively to said adder and said gating means, and for further selectively complementing the output of said output shift register means as applied to said adder.

3. The system according to claim 1 further including input coupling means for providing an integer input to said gating means for alternative coupling to said output shift register means.

4. The system according to claim 1 further including adding means for receiving the first and second exponents from the first and second exponent input means and for selectively adding, subtracting and selecting the larger of said exponents, and counter register means for receiving a selected output of said adding means to provide a floating point exponent output.

5. The system according to claim 4 further including means for incrementing and decrementing said counter register means while respectively right-shifting or left-shifting the contents of said output shift register means.

6. A floating point system for selectively performing a plurality of arithmetic operations, said system comprising:

an exponent circuit comprising means for selectively adding, subtracting and selecting the larger of a pair of input exponents, and a mantissa circuit comprising a first digital register, a second digital register, and a computing loop including a shift register, adding means, and gating means wherein said shift register is coupled to supply mantissa information to said adding means for addition to a mantissa input value from a first digital register, and said gating means is connected for coupling the sum output of said adding means into said shift register in a cycle of operation, said gating means being alternatively operable for suppling other mantissa information to said loop comprising information from said second digital register, and means for shifting information in said shift register for application of the shift register's output to said adding means in selected arithmetic operations.

7. A floating point system for providing a plurality of arithmetic operations and adapted for coupling to a computer comprising:

a first digital register, a second digital register, and a shift register, each of said registers having substantially similar capacity in number of stages for each storing the digits of floating point mantissa words, an adder comprising means for selectively performing addition on mantissa digits derived from said registers, a loop circuit including said shift register and said adder wherein said adder is coupled to receive a mantissa input from the first digital register for adding the same to the output of said shift register as received in said loop circuit, while providing a sum output in said loop circuit for entry back into said shift register in a single cycle for replacing prior information located therewithin, and including gating means coupled with said loop circuit for selectively coupling the sum output of said adder into said shift register and for selectively coupling mantissa information from the second digital register into said shift register with the same relative placement in said shift register as the sum output of said adder for arithmetic operation thereupon in said loop circuit including said adder.

8. A floating point system for providing a plurality of arithmetic operations and adapted for coupling to a computer comprising:

a loop circuit including a shift register and an adder wherein said shift register is coupled to receive one input, and said adder is coupled to receive another input for adding the same to the output of said shift register as received in said loop circuit, while providing an output in said loop circuit for entry back into said shift register in a single cycle for replacing prior information located therewithin, said loop circuit including gating means for selectively coupling the output of said adder to said shift register, and coupling information external to said loop circuit into said shift register, and including quotient register means adapted to receive successive bits produced by successive additions by said adder and for alternatively providing a quotient output to said shift register via said gating means.

9. A floating point system for selectively performing a plurality of arithmetic operations, said system comprising:

an exponent circuit comprising means for selectively adding, subtracting and selecting the larger of a pair of input exponents, and a mantissa circuit comprising a computing loop including a register, adding means, and gating means therebetween wherein said register is coupled to supply information to said adding means for addition to an input value, and said gating means is connected for coupling the output of said adding means into said register in a cycle of operation, said gating means being alternatively operable for supplying external information to said register means, and including means for selectively complementing the output of said register as applied to said adding means, and means for shifting information in said register for application of the register's output to said adding means in selected arithmetic operations.

10. A floating point system for selectively performing a plurality of arithmetic operations, said system comprising:

an exponent circuit comprising means for selectively adding, subtracting and selecting the larger of a pair of input exponents, and a mantissa circuit comprising a computing loop including a first register, adding means, and gating means therebetween wherein said first register is coupled to supply information to said adding means for addition to an input value, and said gating means is connected for coupling the output of said adding means into said first register in a cycle of operation, said gating means being alternatively operable for supplying external information to said first register, means for shifting information in said first register for application of the register's output to said adding means in selected arithmetic operations, a quotient register for selectively receiving output bits from said adding means upon successive subtractions provided by said adding means and means for coupling the output of said quotient register via said gating means as an input to said first register, and means for selectively operating said gating means in accordance with the state of successive of said output bits from said adding means for replacing the information in said first register with the result of said subtraction.

11. A floating point system for providing a plurality of arithmetic operations and adapted for coupling to a computer comprising:

at least three digital registers wherein at least one such register comprises a shift register, each such register having substantially similar capacity in number of stages for each storing the digits of floating point mantissa words, an adder comprising means for selectively performing addition on mantissa digits derived from said registers, a loop circuit including said shift register and said adder wherein said adder is coupled to receive a mantissa input from one of the remaining registers for adding the same to the output of said shift register while providing an adder output in said loop circuit for substantially immediate entry back into said shift register, and means for entering mantissa information from another of said remaining registers into said loop circuit with the same relative digital placement in said loop circuit as other information circulated in said loop circuit for arithmetic operation thereupon in said loop circuit including said adder.

12. A floating point system for providing a plurality of arithmetic operations and adapted for coupling to a computer comprising:

at least three digital registers wherein at least one such register comprises a shift register, an adder, a loop circuit including said shift register and said adder wherein said adder is coupled to receive a mantissa input from one of the remaining registers for adding the same to the output of said shift register while providing an adder output in said loop circuit for substantially immediate entry back into said shift register, and means for successively shifting information in said shift register while controlling successive addition operations in said adder in response to the presence of successive digits of a multiplier in another remaining register.

13. A floating point system for providing a plurality of arithmetic operations and adapted for coupling to a computer comprising:

a loop circuit including a shift register and an adder wherein said shift register receives one input and said adder receives another input for adding the same to the output of said shift register, providing an algebraic sum in said loop circuit for selective entry back into said shift register for selectively replacing prior information located therewithin, means coupled to the loop circuit for selectively coupling the sum output of said adder back into said loop circuit for entry into the shift register and for coupling other information external to said loop circuit into said loop circuit, and including quotient register means coupled to said adder and responsive to successive additions by said adder for alternatively providing a quotient output.

14. A floating point system for providing a plurality of arithmetic operations and adapted for coupling to a computer comprising:

a first digital register, a second digital register, a loop circuit including a shift register and an adder wherein said adder is coupled to receive a mantissa input from the first digital register for adding the same to the output of said shift register as received in said loop circuit, while providing a sum output in said loop circuit for entry back into said shift register in a single cycle for replacing prior information located therewithin, gating means coupled with said loop circuit for selectively coupling the sum output of said adder into said register and for selectively coupling mantissa information from the second digital register into said shift register for arithmetic operation thereupon in said loop circuit including said adder, timing means for successively shifting information in said shift register and exponent means for receiving first and second exponent inputs and selectively providing an algebraic addition of the two, and the larger of the two, and counter means receiving the output of the exponent means, said timing means for shifting information in said shift register being coupled for selectively incrementing or decrementing the contents of said counter means in accordance with the shifting direction of said shift register.

15. A floating point system for providing a plurality of arithmetic operations and adapted for coupling to a computer comprising:

a first digital register, a second digital register, a loop circuit including a shift register and an adder wherein said adder is coupled to receive a mantissa input from the first digital register for adding the same to the output of said shift register as received in said loop circuit, while providing a sum output in said loop circuit for entry back into said shift register in a single cycle for replacing prior information located therewithin, gating means coupled with said loop circuit for selectively coupling the sum output of said adder into said register and for selectively coupling mantissa information from the second digital register into said shift register for arithmetic operation thereupon in said loop circuit including said adder, and timing means for successively shifting information in said shift register while controlling successive addition operations in said adder in response to the presence of successive digits in said second digital register as a multiplier.

* * * * *